(12) United States Patent
Dempsky et al.

(10) Patent No.: US 9,628,437 B2
(45) Date of Patent: *Apr. 18, 2017

(54) SELECTIVE PROXYING IN DOMAIN NAME SYSTEMS

(71) Applicant: Cisco Technology, Inc., San Jose, CA (US)

(72) Inventors: Matthew Dempsky, San Francisco, CA (US); David Ulevitch, San Francisco, CA (US); Noah Treuhaft, Oakland, CA (US); Michael Damm, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/879,897

(22) Filed: Oct. 9, 2015

(65) Prior Publication Data

US 2016/0036763 A1 Feb. 4, 2016

Related U.S. Application Data

(63) Continuation of application No. 14/229,731, filed on Mar. 28, 2014, now Pat. No. 9,160,702, which is a
(Continued)

(51) Int. Cl.
*G06F 15/16* (2006.01)
*H04L 29/12* (2006.01)

(52) U.S. Cl.
CPC ...... *H04L 61/1511* (2013.01); *H04L 61/6013* (2013.01)

(58) Field of Classification Search
USPC ..... 709/223, 225, 227, 228, 229, 245; 726/2
See application file for complete search history.

(56) References Cited

U.S. PATENT DOCUMENTS

| 6,907,525 B2 * | 6/2005 | Pazi | H04L 29/12066 709/225 |
| 7,228,359 B1 * | 6/2007 | Monteiro | H04L 29/12066 709/228 |

(Continued)

FOREIGN PATENT DOCUMENTS

WO   WO01/41401 A2   6/2001

OTHER PUBLICATIONS

Notice of Allowance dated Nov. 15, 2013, U.S. Appl. No. 13/279,075, filed Oct. 21, 2011.
(Continued)

*Primary Examiner* — Quang N Nguyen

(57) ABSTRACT

Systems and methods for processing requests for domain name information in accordance with subscriber information are provided. A request for domain name information can be correlated with subscriber preferences to resolve the domain name information. Domain names may be flagged for blocking or proxying by one or more subscriber preferences. In response to a flagged domain name, a client device can be redirected to a web server that can function as proxy on behalf of the user for accessing the flagged domain. In one example, user preferences and/or network preferences can be used to determine whether a particular user can bypass a blocking preference and access the flagged domain using the proxy.

19 Claims, 10 Drawing Sheets

Related U.S. Application Data continuation of application No. 13/279,075, filed on Oct. 21, 2011, now Pat. No. 8,694,642.

(60) Provisional application No. 61/405,642, filed on Oct. 21, 2010.

(56) References Cited

U.S. PATENT DOCUMENTS

| | | | | |
|---|---|---|---|---|
| 7,313,815 | B2* | 12/2007 | Pazi | H04L 29/12066 709/229 |
| 7,412,515 | B2 | 8/2008 | Kupst et al. | |
| 7,698,375 | B2 | 4/2010 | Hinton et al. | |
| 8,224,994 | B1 | 7/2012 | Schneider | |
| 8,561,161 | B2 | 10/2013 | Blakley et al. | |
| 8,676,989 | B2* | 3/2014 | Treuhaft | H04L 29/12066 709/227 |
| 8,677,451 | B1* | 3/2014 | Bhimaraju | H04L 63/083 726/2 |
| 8,694,642 | B2* | 4/2014 | Dempsky | H04L 61/6013 709/223 |
| 8,966,122 | B2* | 2/2015 | Treuhaft | H04L 61/1511 709/245 |
| 9,276,902 | B2* | 3/2016 | Treuhaft | H04L 29/12066 |
| 9,444,781 | B2* | 9/2016 | Ulevitch | H04L 29/12066 |
| 2005/0097179 | A1 | 5/2005 | Orme | |
| 2006/0002308 | A1 | 1/2006 | Na et al. | |
| 2006/0023744 | A1 | 2/2006 | Chen et al. | |
| 2007/0239865 | A1 | 10/2007 | Tout | |
| 2007/0294419 | A1 | 12/2007 | Ulevitch | |
| 2009/0113074 | A1 | 4/2009 | Statia et al. | |
| 2010/0257232 | A1 | 10/2010 | Joffray et al. | |
| 2010/0274970 | A1 | 10/2010 | Treuhaft et al. | |
| 2011/0019547 | A1 | 1/2011 | De Lutiis et al. | |
| 2012/0117649 | A1 | 5/2012 | Holloway et al. | |
| 2012/0158969 | A1 | 6/2012 | Dempsky et al. | |
| 2012/0278467 | A1 | 11/2012 | Schneider | |
| 2013/0166520 | A1 | 6/2013 | Vass | |
| 2013/0254423 | A1 | 9/2013 | George, IV | |
| 2013/0275570 | A1 | 10/2013 | Treuhaft et al. | |
| 2014/0215092 | A1 | 7/2014 | Dempsky et al. | |
| 2015/0127802 | A1 | 5/2015 | Treuhaft et al. | |

OTHER PUBLICATIONS

Notice of Allowance dated Jun. 2, 2015, U.S. Appl. No. 14/229,731, filed Mar. 28, 2014.

\* cited by examiner

SELECTIVE PROXYING IN DOMAIN NAME SYSTEMS

PRIORITY CLAIM

The present application is a continuation of U.S. patent application Ser. No. 14/229,731, entitled "Selective Proxying in Domain Name Systems," by Dempsky et al., filed Mar. 28, 2014, which is a continuation of U.S. patent application Ser. No. 13/279,075, entitled "Selective Proxying in Domain Name Systems," by Dempsky, et al., filed Oct. 21, 2011, now U.S. Pat. No. 8,694,642, which claims priority from U.S. Provisional Patent Application No. 61/405,642, entitled "Selective Proxying in Domain Name Systems," by Dempsky, et al., filed Oct. 21, 2010, both of which are incorporated by reference herein in their entirety.

BACKGROUND OF THE INVENTION

Field of the Invention

Embodiments in accordance with the present disclosure relate to computer networks, and particularly to processing domain name system (DNS) information.

Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

While early network implementations could utilize a single periodically distributed ASCII file to translate between domain names and IP addresses, modern networks such as the Internet rely on the domain name system (DNS) for the resolution of names and addresses. FIG. 1 is a simplified block diagram illustrating traditional DNS processing. A client computing device 102 includes a resolver 104 for initiating DNS requests. The resolver may be a stand alone component such as a software module of the client, or may be embedded within various applications such as web browsers, file transfer protocol programs, email applications, and the like that utilize Internet resources. When the client requests an Internet resource such as a web page or delivery of an email message, the resolver is charged with determining the IP address(es) of the requested resource so that the appropriate request can be issued to the appropriate address. The resolver is traditionally configured with the addresses of a group of ISP DNS Nameservers 110 that handle recursive DNS processing for the client device. As is often the case, the group of nameservers is provided by the Internet Service Provider (ISP) for the client device, although this isn't required. Nameservers 110 are recursive nameservers which resolve DNS requests using a recursive process that accesses various other nameservers in order to satisfy a given query.

Consider an example DNS request 150 from client 102 to nameserver 112 for the domain name information of "www.opendns.com". The ISP DNS nameserver first checks a local cache to attempt to resolve the request. The ISP DNS nameserver maintains the local cache with domain name records that have already been resolved to improve performance in responding to subsequent DNS requests. If nameserver 112 is maintaining the requested domain name in the local cache, it will issue a DNS response 152 to the client with the domain name record including the IP address of "www.opendns.com".

If the ISP DNS nameserver 112 does not have an entry for the requested domain name, it will launch recursive processing using authoritative DNS nameservers 120 and/or root DNS nameservers 130. An authoritative nameserver maintains an authoritative or master list for a zone which is a group of computing devices. Recursive DNS nameservers obtain domain name information such as the IP address of a requested resource from authoritative nameservers. The root DNS nameservers are also authoritative DNS nameservers. They are called root DNS nameservers because they contain the authoritative domain name information for a set of top level domains (TLDs) in the so-called root zone. For example the root DNS nameservers contain the IP addresses for finding domain name information for lower level domains in the top level domains. The top level domains include the generic top-level domains (gTLD) of .com, .org, .net, etc.

Nameserver 112 first issues a DNS request 154 to root DNS nameservers 130. The root DNS nameservers 130 can include multiple nameservers, one or more of which can be issued a request for the needed information. One of the nameservers 132 responds with a DNS response 156 including the IP address of one or more authoritative name servers for the ".com" domain. When ISP DNS nameserver 112 obtains the IP address for the ".com" domain, it issues another DNS request 158 to the specified one of the authoritative DNS nameservers 120. The specified authoritative nameserver will issue a DNS response 160 with the IP address of one or more nameservers for the "opendns.com" domain. This process repeats between the ISP DNS nameserver and the authoritative name servers 120 until the ISP DNS nameserver receives the IP address for "www.opendns.com". The client 102 application can then issue the resource request to the appropriate computer, such as an HTTP request to the server at the corresponding IP address.

FIG. 2 is a simplified block diagram of a typical authoritative DNS nameserver 120 as shown in FIG. 1 that can store domain name records. In this example, the authoritative DNS nameserver 120 is a computer system with a processor 150 coupled to a communications interface 160 and a memory or storage 170 via a system bus 152. The communications interface 160 exchanges data with a communications network, such as the Internet, via line 154. The processor 150 receives DNS requests from the Internet and resolves the DNS requests based on domain name records, such as a DNS record 180 stored in memory 170. The DNS record 180 includes a domain name 182, which is used as a key to lookup a corresponding IP address 184, and includes a time-to-live (TTL) value 186. The TTL value for the DNS record can be set by the administrator of the authoritative DNS nameserver. The TTL value is provided as part of the DNS response to DNS requests and is used by the receiving nameservers to control how long the DNS record should be maintained and treated as valid.

DETAILED DESCRIPTION

Figure 1:
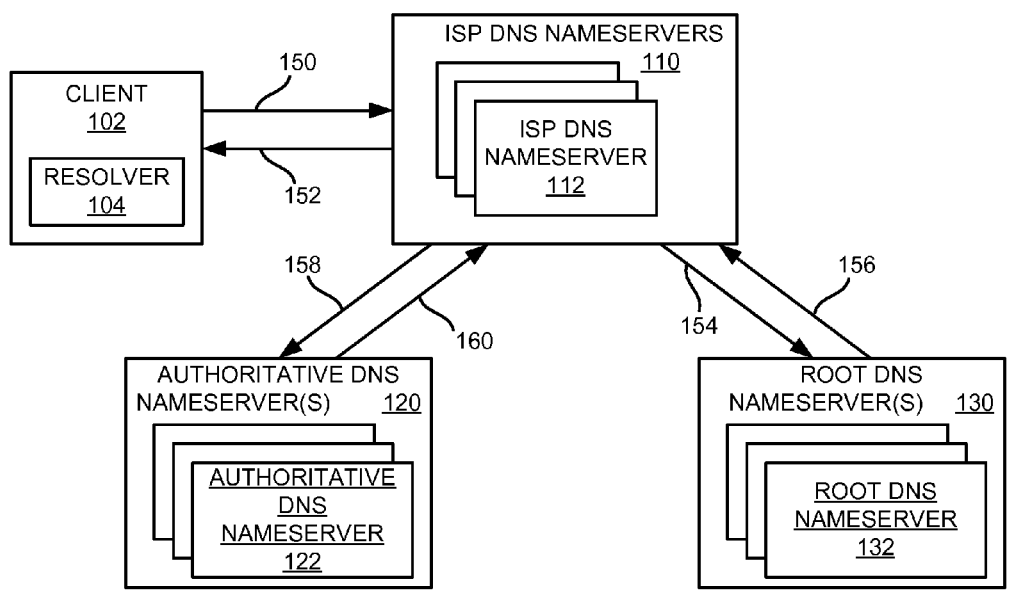
FIG. 1 is a simplified block diagram of a computer network depicting traditional processing of DNS requests.
Figure 2:
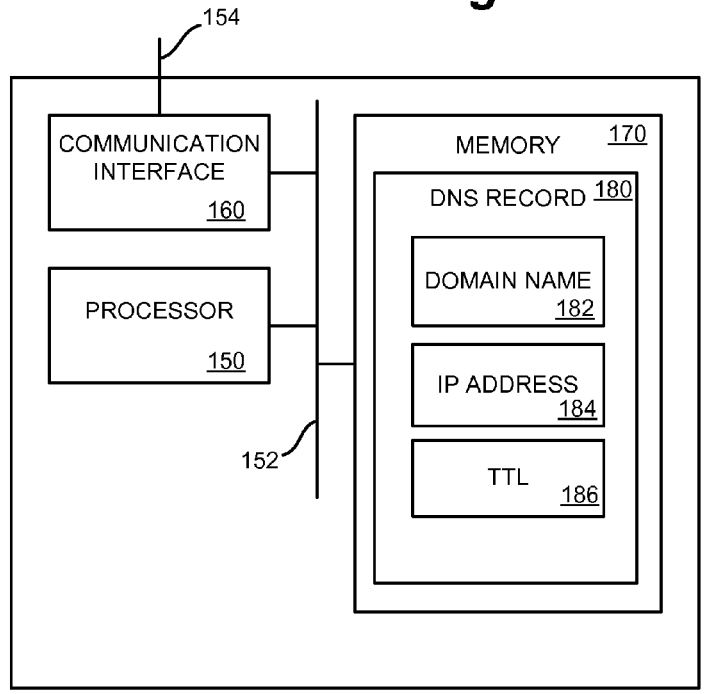
FIG. 2 is a simplified block diagram of an example of an authoritative DNS name server.

Systems and methods for processing requests for domain name information in accordance with subscriber information are provided. A request for domain name information can be correlated with subscriber preferences to resolve the domain name information. Domain names may be flagged for blocking or proxying by one or more subscriber preferences. In response to a flagged domain name, a client device can be redirected to a web server that can function as proxy on behalf of the user for accessing the flagged domain. In one example, user preferences and/or network preferences can be used to determine whether a particular user can bypass a blocking preference and access the flagged domain using the proxy.

In accordance with one embodiment, a method of domain name system (DNS) processing is provided that includes receiving a plurality of DNS requests associated with a first subscriber with the plurality of DNS requests being for a first domain. Based on at least one network record associated with the first subscriber, the method generates a response to each DNS request having domain name information for a second domain. Then, the method includes receiving at the second domain a set of requests for resources from the first domain. For a first request of the set having a predetermined identifier for the first domain, a first response with one or more resources from the first domain is generated and for a second request of the set without a predetermined identifier for the first domain, a second response with one or more resources from the second domain is generated.

In accordance with one embodiment, a method of domain name system (DNS) processing is provided that includes determining at a DNS server subscriber information associated with a first DNS request corresponding to a first domain and in response to the first DNS request and based on the subscriber information, generating a DNS response having domain name information for a second domain. A first resource request corresponding to the first domain is received at the second domain. The first resource request has a first universal resource locator for the first domain. If the first resource request includes a predetermined identifier previously generated by the second domain for the first domain, a request for one or more resources associated with the first resource request is provided from the second domain to the first domain.

In accordance with one embodiment, a method of domain name system (DNS) processing is provided that includes receiving a plurality of DNS requests for a first domain. In response to the plurality of DNS requests, a plurality of DNS replies having domain name information for a second domain are generated. At the second domain, a plurality of resource requests having a resource locator corresponding to the first domain are received. In response to a first subset of the resource requests, a first plurality of replies having one or more resources from the first domain are generated at the second domain and in response to a second subset of the resource requests, a second plurality of replies having one or more resources from the second domain are generated at the second domain.

In accordance with one embodiment, a method of domain name system (DNS) processing is provided that includes receiving a plurality of DNS requests associated with a first network identifier with each DNS request including a requested domain from a set of domains. For each DNS request of the plurality that is associated with a first subset of domains, a DNS reply having domain name information for its requested domain is generated. For each DNS request of the plurality that is associated with a second subset of domains, a DNS reply having domain name information for a substitute domain is generated. A first set of resource requests associated with the first network identifier is received at the substitute domain. Each resource request in the first set includes a requested domain from the second subset of domains. For each resource request in the first set, a reply having one or more resources from the requested domain corresponding to said each resource request is generated at the substitute domain.

In accordance with one embodiment, a method of domain name system (DNS) processing is provided that includes receiving at a domain name server a first DNS request, determining from the first DNS request a requested domain and a source internet protocol (IP) address, accessing a network record for a subscriber of DNS resolution services based on source IP address, and based on the network record, generating a first DNS reply having domain name information for a first substitute domain. The method further includes receiving a first HTTP request at a first web server associated with the first substitute domain where the first HTTP request includes a first universal resource locator for the requested domain, generating a first HTTP redirect having a universal resource locator for a second substitute domain in response to the first HTTP request. The method then includes receiving at least one second HTTP request at a second web server associated with the second substitute domain, accessing a user record based on the at least one second HTTP request, and based on the network record, generating a second universal resource locator for the requested domain and generating a second HTTP redirect including the second universal resource locator for the requested domain. The method then includes receiving at the first web server a third HTTP request having the second universal resource locator for the requested domain, and based on the second universal resource locator for the requested domain, generating a third HTTP redirect including the first universal resource locator and a first cookie for the requested domain. Then, a fourth HTTP request including the first universal resource locator and the first cookie is received at the first web server and the fourth HTTP request is proxied based on the first cookie.

Figure 3:
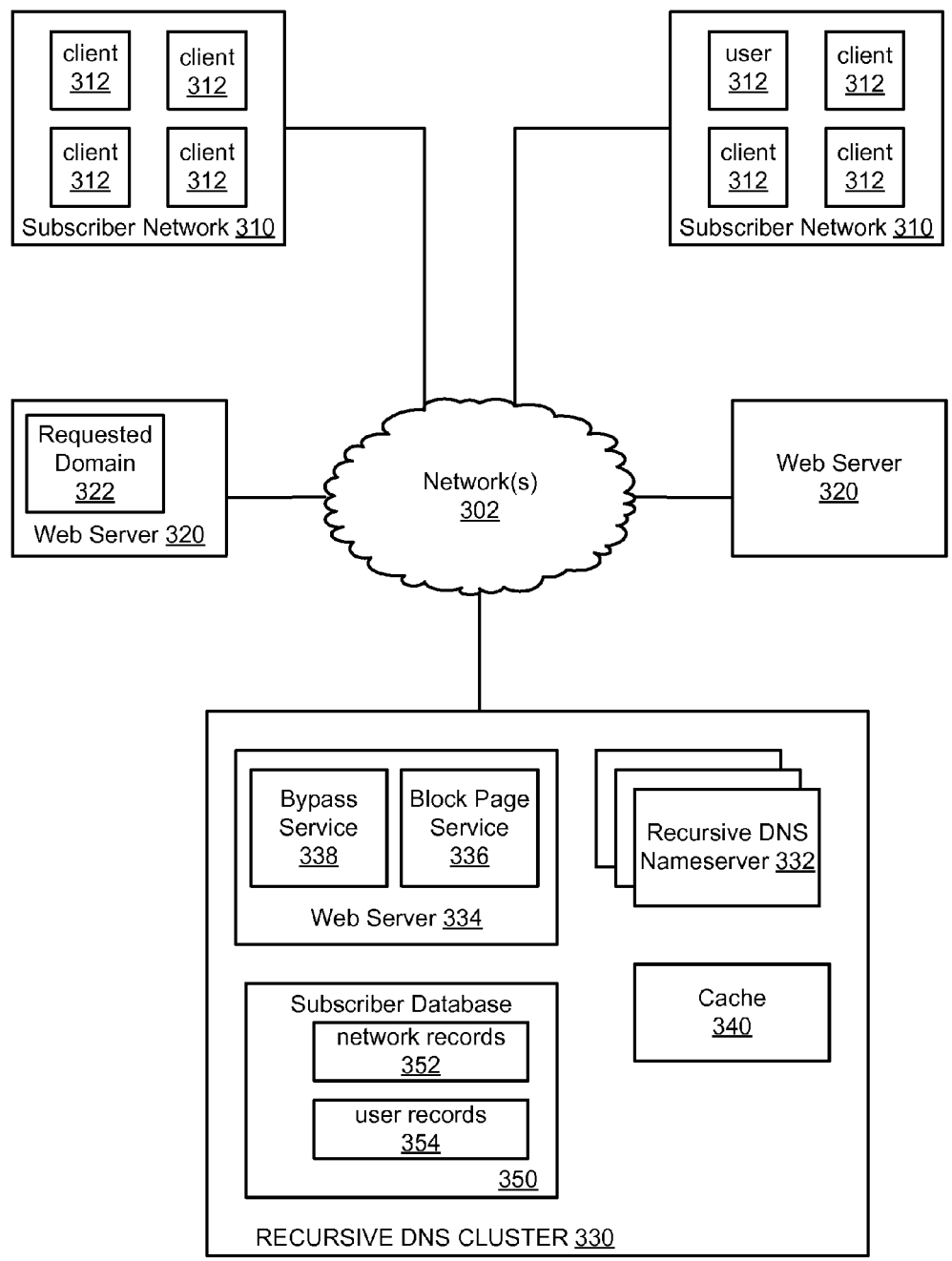
FIG. 3 is a simplified block diagram of a computing system including a recursive DNS nameserver in accordance with one embodiment of the disclosed technology.

FIG. 3 is a block diagram of a system for processing domain name system (DNS) requests in accordance with one embodiment of the present disclosure. Subscriber networks 310, web servers 320 and a recursive DNS cluster 330 are each in communication with one or more network(s) 302. Although two subscriber networks with four client devices each are shown, any number of subscriber networks or client devices may be used.

Network(s) 302 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information. While the cluster in FIG. 3 is depicted with multiple recursive DNS nameservers, other embodiments may include a single computing system within a cluster such as a single server. The individual recursive nameservers in a cluster can be formed of hardware and/or software configured as described for domain name resolution. By way of non-limiting example, the various nameservers can include personal computers, servers, workstations, mainframes, etc.

Each of the recursive DNS nameservers in a cluster resolves requests for domain name information from other computing devices such as client devices 312 operated by individual users on a subscriber network 310. The nameservers 332 in cluster 330 include or are in communication with a local cache 340 and subscriber database 350. In one example, each nameserver in a cluster provides part of the local cache for storing domain name information in that cluster. A portion of the local cache can be stored in each of the recursive DNS nameservers. In other examples, each nameserver can include an individual cache or a cache can be maintained independently of the nameservers.

The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The cache at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request.

When DNS requests from client 312 or other computing devices cannot be fulfilled with cached domain name information, the recursive DNS cluster initiates recursive processing to determine the needed information. For example, a DNS nameserver 332 may first issue a DNS request to one of the root servers for generic top level domain information, followed by one or more DNS requests to various authoritative name servers to determine the requested domain name information.

A response can also include a packet, cell, message, or signal used for transmitting domain name information. A Uniform Resource Locator (URL) identifies resources available through network hosts. Some examples of URLs are http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

Each nameserver can also provide all or part of the subscriber information for the cluster or other types of storage can be used. The subscriber information in each cluster provides an indication to the recursive DNS servers of how to resolve requests for domain name information for different senders, owners, users, or subscribing entities associated with requests for domain name information. Examples of subscriber information include preferences, rules, policies, regular expressions, and the like.

In response to a DNS request for domain name information associated with a domain name, a recursive DNS nameserver within a cluster can determine a subscriber identifier. A subscriber identifier discriminates the sender, owner, user, or subscribing entity associated with the request for domain name information. Some examples of a subscriber identifier are IP addresses, userid's, and secure tokens. If an IP address identifier is used, the recursive DNS nameserver can inspect the network packet containing the request to determine the source IP address of the packet. A username or secure token may be included in the request for domain information from which the recursive DNS nameserver determines the subscriber identifier and the subscriber information, for example when a device on a subscriber's network is setup to modify DNS requests to include such identifiers.

A subscriber is generally an individual and/or entity that agrees to service conditions of an operator of a recursive DNS cluster 330. Subscribers may range from entities operating large networks 310, such as those provided by a wireless service providers or large corporations, to individuals having a home internet connection. It is noted that while subscriber networks 310 are depicted with multiple client devices 312, that is not required. In a simple example, the subscriber may operate a single personal computer with an internet connection. Embodiments in accordance with the present disclosure may be applied in any type of environment.

The recursive DNS nameserver resolves a particular request for domain name information based on the subscriber information to generate a response in one embodiment. The recursive DNS nameserver then returns the response to the subscriber or a user associated with a subscriber, providing the resolved domain name information in accordance with the subscriber information. By way of example, a substitute network (e.g., IP) address that satisfies a substitution criterion for the domain name in the request for domain name information may be obtained.

In addition to determining an IP address for a domain name, nameservers 332 may use network records 352 and/or user records 354 in subscriber database 350 to determine a particular IP address to resolve for a given domain name. The network and user records may specify one or more DNS resolution options, filters, features or other techniques for determining what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

In some embodiments, a user or subscriber of a service provided by the DNS cluster may set one or more preferences or selections for how the options are to be enabled or otherwise applied when a DNS nameserver 332 resolves DNS queries associated with the user. Preferences or settings for a user or subscriber may be stored as subscriber information at subscriber database 350 or in one or more storage devices accessible to the DNS cluster 330. Upon identifying the user, subscriber information associated with the user may be used to alter the IP address in a DNS response that the user receives. For example, a user or subscriber may establish subscriber information that instructs the DNS nameserver to alter responses to DNS requests that are associated with adult web sites, potential phishing or pharming sites, and other sites deemed inappropriate by the user or to which the user wishes to block or filter access, etc.

Network records 352 specify preferences or selections for resolving domain name queries associated with a particular subscriber's network or networks 310. The subscriber may specify resolution preferences that will apply to all traffic originating at their network 310 in one embodiment. DNS nameserver 332 can use a network identifier, such as an IP address from which the DNS query was issued, to determine a corresponding network record 352. A subscriber may set permissions and preferences in network records to indicate that certain preferences can be bypassed by particular users of the subscriber's network. For example, an administrator for a corporate network 310 may set up network records 352 to allow certain users of network 310 to bypass particular preferences in the network records, such as those blocking access to certain domains. Alternatively or additionally, permissions and preferences for overriding network preferences may be included in user records 354.

User records 354 include subscriber information for individual users or entities using the services of DNS cluster 330. An individual user may specify resolution preferences or selections that will apply to individual DNS requests issued by the user. DNS nameserver 332 can use a userid, token or other identifier to determine a corresponding user record 354 for a particular request. As will be described in more detail hereinafter, the user records may not be used in some examples by the DNS nameservers 332, but used by bypass service 338 and/or block page service 336 in processing user resource requests. User records and network records may be used together to determine a set of permissions or preferences for applying to any individual request for domain name information, or requests for actual resources as will be explained hereinafter. For example, a user may set a preference in a user record allowing access to a certain category of domains, while a network record may indicate that users are not allowed to override the network preference set by the subscriber. In this manner, the nameservers and/or block page and block page bypass (BPB) domains operating as set forth below may use both types of records in responding to a resource request or DNS request. This permits a user to define a set of user preferences that can be applied when using different subscriber networks 310.

The domain name records in cache 340 may be associated with or have therein one or more flags. A flag can be any indicator, marking, or symbol associated with a domain name. For example a binary indicator stored in the domain name record can be used. A flag may be used to identify any type of information for a particular domain. For example, a flag may be used to mark a domain name as being suspicious or untrustworthy, such as a site engaged in pharming or phishing activities. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain according to their age-appropriateness. Flags can also be set in domain name records to cause requests for a particular domain to be proxied. This can allow a subscriber to have traffic for certain domain names proxied, for example for logging, auditing and the like, while traffic for all other domains is not proxied.

When a request for domain name information is received, the DNS nameserver 332 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver may generate a DNS response with a substitute IP address that directs the client device to an alternate domain. In one example, the DNS nameserver provides the client device with domain name information associated with block page service 336 on web server 334. In response to the client device's resource request, the block page service can provide a block page to the client device, for example, informing the user that the requested domain is not accessible on their network.

In one embodiment, the DNS cluster provides a bypass or override option so that individual users can be allowed to access domains that a subscriber has indicated should be blocked for traffic originating at the subscriber's network or networks. As earlier described, many users of client devices 312 will be using a subscriber network 310. DNS requests originating from these subscriber networks 310 may not be capable of discrimination to determine a particular user or client device issuing the request. For example, DNS requests from any of the client devices 312 on a particular subscriber network 310 may include the same source IP address. This may also be the case for multiple users using a single machine or access point to network 302, as may occur in a home or other shared computing environment. Accordingly, the DNS nameserver 332 in such instances may only be able to determine an IP address identifier for the DNS query. As such, the DNS nameserver may only use network records 352 to resolve the DNS request. This can present challenges if the subscriber wishes to permit some users to access particular domains while prohibiting other users from accessing those domains.

Accordingly, one embodiment includes providing domain name information for block page domain 336 in response to a DNS request for a requested domain that is blocked according to network records 352 for a given request. In this embodiment, the block page domain 336 does not responded to the client resource request with a block page informing the user that the domain is blocked. Instead, the block page service redirects the client device to bypass service 338 where the user can be authenticated by supplying a username and password, for example. If the user is authenticated, the bypass service accesses subscriber information in database 330 to determine whether the user is permitted access to the requested domain. The bypass service may use network records 352 and/or user records 354 to determine whether the user is permitted access. For example, a network record may indicate that the domain is to be blocked, but that select users can bypass the block.

If the user is permitted access to the requested domain, the bypass service redirects the client to the block page service. The block page service then serves as a web proxy to handle traffic between the requested domain 332 and the client device 312. Various cookies, such as a master cookie for the domain of bypass service 338 and bypass cookies for the requested domain, may be used to facilitate proxying of the traffic between the client device 312 and requested domain 322.

In one embodiment, a subscriber may use preferences in network records 352 to cause selective web proxying for particular domains. This selective web proxying may be independent of any domain name blocking and/or bypasses. In one example, the DNS nameserver obtains a network record based on the source IP address of a DNS request and correlates the preferences in the record with any flags in the domain name record for the requested domain. If the network record indicates that traffic for the requested domain should be proxied, the DNS nameserver provides a DNS response to the client with domain name information for the block page service 336. The block page service can then proxy traffic between the client device and the requested domain. The block page service may redirect the client to the bypass service for authentication in one example, but this is not necessary. The block page service can then audit or log traffic between the client device and the requested domain. The traffic may be monitored based on the source IP address to provide aggregate data for all traffic originating at a particular subscriber network 310. If the user is authenticated before proxying the traffic, the traffic may be monitored by each particular user to provide individual data for traffic originating from particular users.

Figure 4:
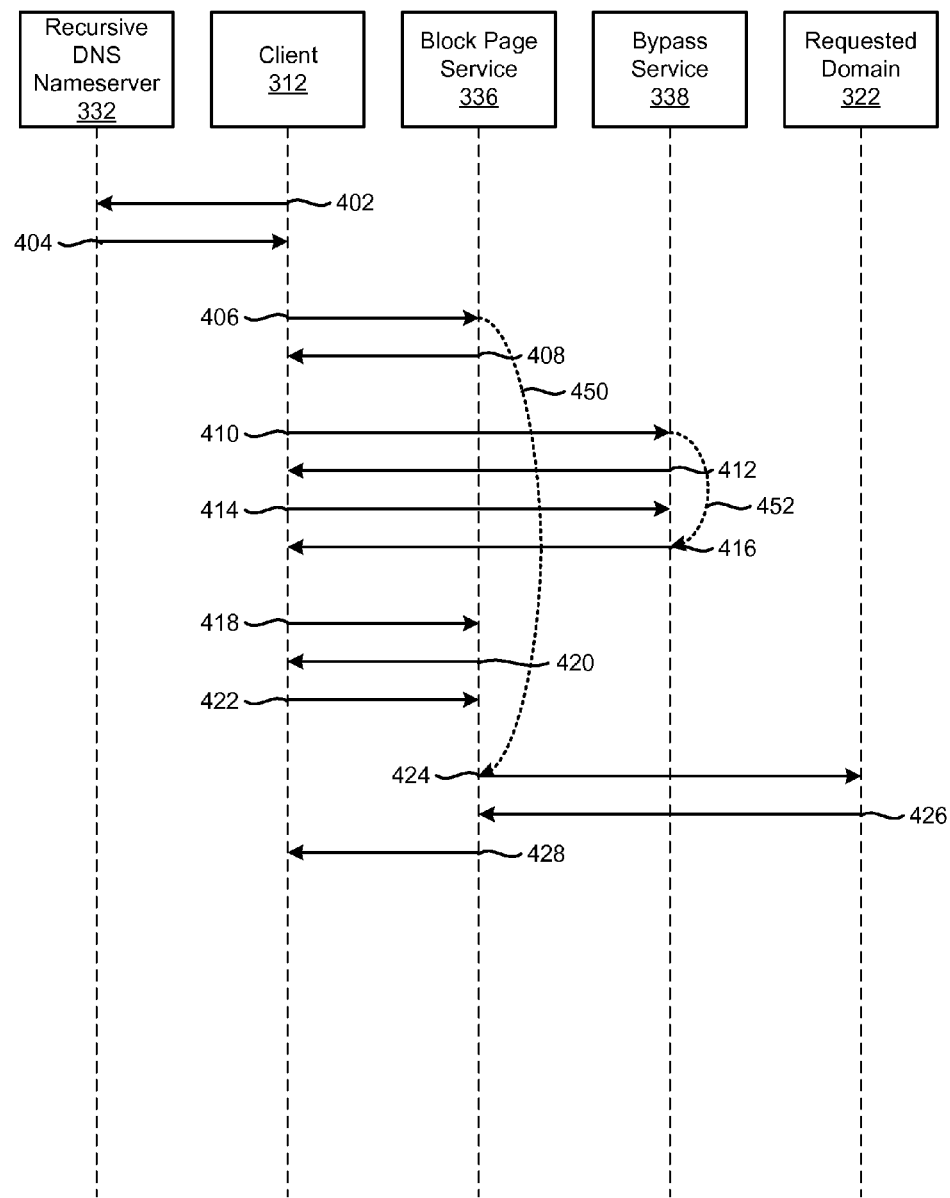
FIG. 4 is a timing diagram depicting traffic between various components of FIG. 3 when processing a DNS request.

FIG. 4 is a diagram depicting traffic between a user at client device 312 at subscriber network 310 and various components of DNS cluster 330 when resolving a request for domain name information in one example. A user, via a client device 312, issues domain name system (DNS) request 402 to recursive DNS nameserver 332. In response to request 402, nameserver 332 provides a DNS response with domain name information based on the requested domain name and subscriber information in database 350.

In response to request 402, nameserver 332 obtains domain name information for the requested domain name. The nameserver may acquire a domain name record for the requested domain name from cache 340 in one example. If a domain name record is not available for the requested domain name, the nameserver may recursively resolve the domain name information by issuing requests to one or more root, authoritative and/or other recursive domain nameservers.

The nameserver also obtains a network record for a particular subscriber associated with the IP address in the DNS request in order to resolve the requested information. In this example, request 402 is from a user operating a client device on network 310, and thus, is only identified by an IP address for subscriber network 310. Because the DNS request issues from subscriber network 310, an identifier for the particular user 312 issuing the request is unknown. Accordingly, nameserver 332 obtains one or more network records 352 from subscriber database 350 that match the IP address associated with network 310.

Nameserver 332 resolves request 402 based on preferences in the one or more network records 352 associated with the IP address of the request 402. In this particular example, the requested domain is associated with one or more flags corresponding to one or more preferences of the subscriber indicating that the domain name information should not be provided to users of network 310. Accordingly, nameserver 332 does not provide domain name information for the requested domain name to user 312, but instead, provides DNS response 404 with domain name information associated with the block page service at web server 334.

Upon receiving DNS response 404, the client 312 issues a resource request 406, such as an http request, to the block page service 336 using the domain name information provided by nameserver 332. The block page domain checks the request from client 312 for a bypass cookie set for the requested domain, which will be identified in request 406 when passed from client 312 to server 334.

In this example, block page service 336 determines that the client device 312 does not have a bypass cookie for the requested domain. Since a bypass cookie for the requested domain 322 was not found, the block page service issues a response 408 to client 312 with an http redirect to the bypass service 338.

Upon receiving http response 408, client 312 issues a request 410 to bypass service 338 after receiving the appropriate domain name information. The bypass service checks request 410 for a master cookie for the bypass domain.

If a master cookie is not passed from client 312, the bypass service provides a response 412 to the client device 312 with an authentication form for the user to supply authentication information such as a username and password. After filling out the form, the client device issues a request 414 to bypass service 338, passing the authentication data.

After authenticating the user, the bypass service accesses a user record 354 and/or network record 352 to determine whether the user is authorized to access the requested domain 322. In this example, the bypass service determines that the user may access the requested domain, and in response generates a master cookie for the client device 312 that identifies the user issuing the request. The master cookie is set on the client device for the domain of the bypass service and can be used in future requests to bypass authentication. The bypass service also generates a unique URL for the requested domain. The unique URL is formatted to be recognized by the block page service so that a bypass cookie for the requested domain can be set on the client device by the block page service to facilitate future proxying.

The master cookie for the bypass service and the unique URL for the requested domain are then passed to the client device in response 416. Response 416 contains a redirect to the requested domain, indicated by the unique URL generated by the bypass service.

Upon receiving response 416, client 312 issues request 418 to the domain of block page service 336 having a destination URL corresponding to the unique URL generated by the bypass service. The block page service 336 recognizes the unique URL, for example, by parsing the URL and determining the presence of a predetermined identifier. If the unique URL is recognized as containing the predetermined identifier, the block page service 336 generates a bypass cookie for the requested domain. The bypass cookie can be set on the client device to allow future requests to bypass authentication for the requested domain and/or other domains (e.g., those in a same category as the requested domain).

The bypass cookie and a redirect having a URL for the requested domain 322 are then passed to the client device in response 420. The redirect URL contains the originally requested URL in one example. In another example, the redirect URL is a second unique URL, identifying the requested domain resource but further containing an identifier recognizable by the block page service. Upon receiving response 420, the client device issues request 422 to the block page service containing the redirect URL. The block page service 336 proxies request 422, itself issuing a request 424 to the requested domain for the originally requested resource. The requested domain replies with response 424. The block page service then replies to the client 412 with response 426, containing the originally requested network resource.

Arrow 450 depicts the traffic in a situation where the client device contains a bypass cookie for the requested service 322. When block page service 336 receives request 406 specifying the requested domain 322, it will check the request to determine if the client device contains a bypass cookie for the requested domain. If the bypass cookie is present, the block page domain determines that the user has already been authenticated or does not need to be authenticated for the requested domain. Accordingly, the block page service immediately proxies the request, without authenticating or setting a bypass cookie on the client device. Arrow 450 depicts the block page domain skipping the traffic indicated at 408-422 and instead, issuing a request 424 for the network resource on behalf of the client device.

Arrow 452 depicts the traffic in a situation where the client device contains a master cookie for the domain of the bypass service, but does not contain a bypass cookie for the requested domain. When bypass service 338 receives request 410 from the client device, it determines that the master cookie is present and thus, that the user does not need to undergo authentication. Accordingly, the bypass service will determine if the user contains the necessary permissions or preferences for accessing the requested domain, and if so issue response 416 with the unique URL. In one embodiment, the bypass service resets or extends the expiration of the master cookie when issuing response 416.

Figure 5:
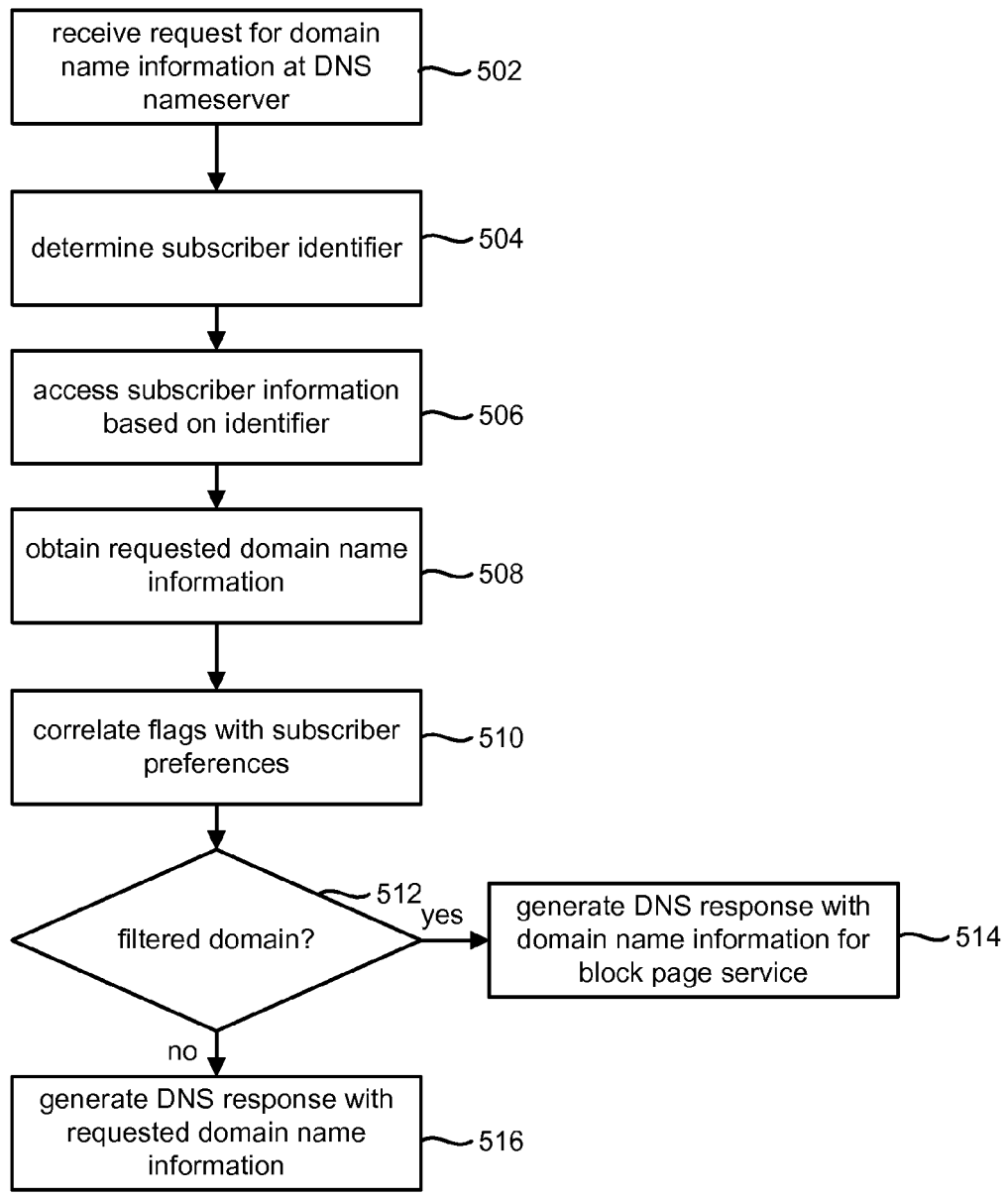
FIG. 5 is a flowchart describing a method of processing a DNS request in accordance with one embodiment.

FIG. 5 is a flowchart describing a method of processing domain name requests by a recursive DNS cluster in accordance with one embodiment of the present disclosure. At step 502, a DNS nameserver 332 receives a request for domain name information from a client device 312. In this example, it is assumed that the client device 312 is part of a subscriber network, and thus, that a unique IP address distinguishing the client device from another client device cannot be obtained. At step 504, the DNS nameserver determines a subscriber identifier associated with the DNS request. In one example, the DNS nameserver parses the DNS request for the source IP address which is used as the subscriber identifier. At step 506, the DNS nameserver uses the subscriber identifier to obtain a corresponding network record 352 from database 350. At step 508, the DNS nameserver obtains the requested domain name information. Step 508 may include determining the domain in the request for domain name information and checking cache 340 for a domain name record corresponding to the requested domain. If the cache contains a domain name record for the requested domain and the record is not expired, the DNS nameserver obtains the cached domain name record. If the cache does not contain a domain name record for the requested domain or if the domain name record is expired, the DNS nameserver attempts to retrieve the domain name information using one or more authoritative and/or root DNS nameservers.

After obtaining the domain name information, the DNS nameserver determines whether there are any flags associated with the requested domain and if so, correlates the flags with the preferences in the network record 352 at step 510. Step 510 includes determining whether the domain name information for the requested domain includes any identifiers corresponding to preferences in the network record. For example, step 510 may include determining an age-rating for the domain and comparing that with an age-rating preference in the network record.

If any of the flags correlate to preferences in the network record, the DNS nameserver determines if any of the flags and corresponding network preferences indicate that the traffic to the domain should be filtered at step 512. In one embodiment, step 512 includes determining whether the network records indicate that the requested domain should be blocked for requests from the subscriber's network. Step 512 may also include determining whether the records indicate that traffic for the requested domain should be proxied, but access still allowed.

If the domain name information contains a flag indicating that the requested domain should be proxied or blocked, the DNS nameserver issues a DNS response at step 514 with domain name information for the block page service 336 at web server 334. If the domain is not to be blocked or proxied for the subscriber's network, the DNS nameserver issues a DNS response at step 516 with domain name information for the requested domain.

Figure 6:
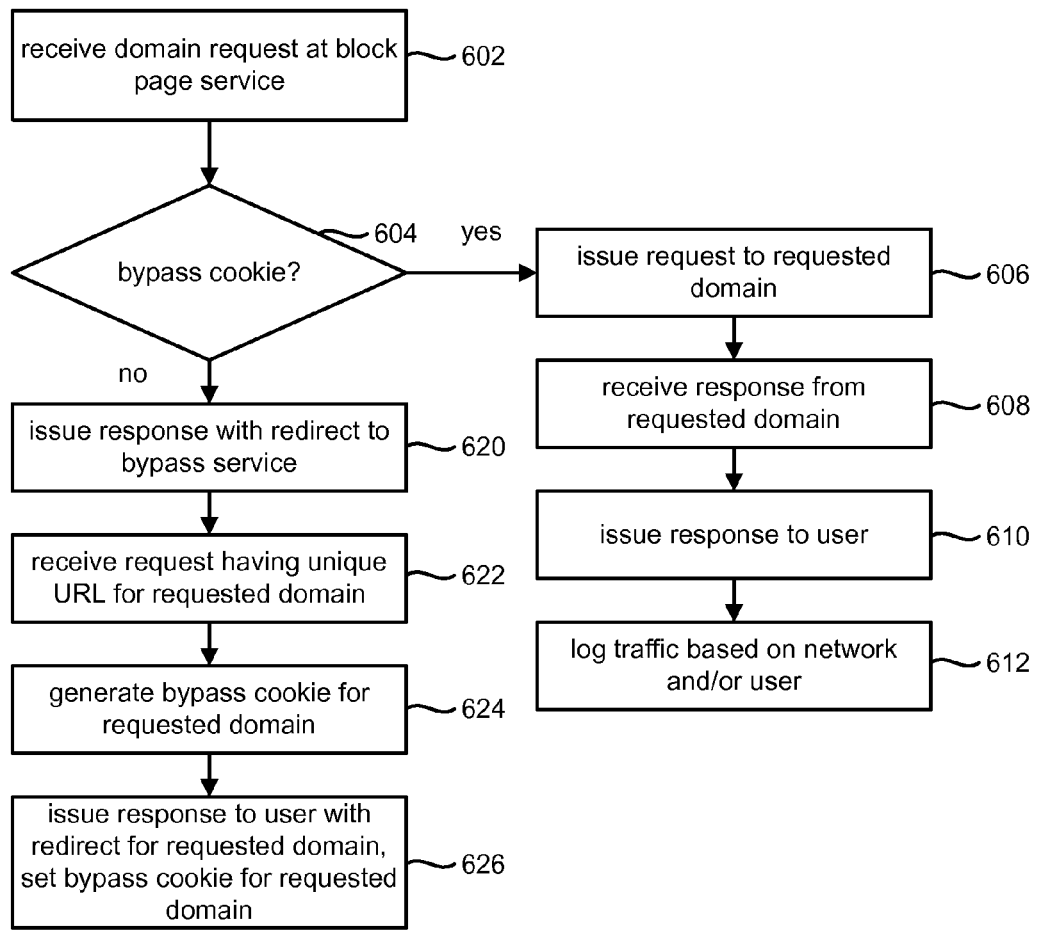
FIG. 6 is a flowchart describing a method of processing a request for a requested domain as can be performed by a block page domain in accordance with one embodiment.

FIG. 6 is a flowchart describing a method of processing requests for filtered domains, as may be performed by the block page service 336 at web server 334 in one embodiment. The process of FIG. 6 may be performed for a request issued by a client device 312 after obtaining the DNS response generated by the DNS nameserver 332 at step 514 of FIG. 5 in one embodiment.

At step 602, the request for the requested domain is received at the block page service 336. Step 602 is often an http request specifying the requested domain and a network resource hosted at that domain, but any suitable protocol for requesting network resources may be used. The client device provides a URL specifying a particular resource such as a web page at the requested domain. When the block page domain receives a resource request having a destination URL that does not correspond to the block page domain, the block page domain can institute processing as set forth in FIG. 6 in one example.

At step 604, the block page domain checks the request passed by client device 312 for a bypass cookie. A bypass cookie passed with the request will be set for the requested domain, not the domain of the block page service. If the client device has a bypass cookie set for the requested domain, the block page service proxies the request for the network resource as set forth in steps 606-616. If the client device does not have a bypass cookie set for the requested domain, the block page domain uses one or more redirects to begin an authentication process for the user at steps 620-626. More details regarding bypass cookies for requested domains are provided hereinafter.

If the client device passes a bypass cookie for the requested domain, the block page domain issues a request for the network resource from the requested domain at step 606. Step 606 may include obtaining domain name information for the requested domain from local cache 340 or by resolving the domain name. At step 608, the block page service receives the network resource from the requested domain and issues a response to the client device at step 610 with the resource from the requested domain. The block page service may optionally log the traffic for auditing, etc. at step 612. Step 612 can include logging and associating the traffic with a particular user of client device 312, or only with a subscriber network 310 if the user is not authenticated.

If a bypass cookie for the requested domain is not set on client device 312, the block page service 336 redirects the client device to the bypass service 338 at step 620. In one example, step 620 can include providing an http redirect with the block page service domain as the destination URL. Other types of redirects can be used.

The bypass service will attempt to authenticate the user issuing a request. The user is authenticated by the block page bypass domain, if necessary, for the requested domain, and the bypass service determines whether the user is permitted access. If the user is permitted access to the domain, or if the domain does not require authentication, the bypass service redirects the client device 312 back to the block page service. The bypass service sets a unique destination URL for the requested domain in the http redirect, and if necessary, sets a master cookie on the client device. More information regarding the operations of bypass service are described hereinafter.

At step 622, the block page service receives a request from the client device 312 as a result of the redirect issued by the bypass service. The request at step 622 contains the unique URL provided by the bypass service. The block page service recognizes the unique URL, for example, by a predetermined identifier included in the unique URL.

In response to the unique URL, the block page service determines that a bypass cookie should be set on the client device for the requested domain. The block page service generates the bypass cookie for the requested domain, specified in the unique URL, at step 624. At step 626, the block page service issues a response to the client device 312 and passes the local cookie for the requested service. The response at step 626 includes an additional redirect back to the block page service. The destination URL of the redirect specifies the originally requested domain. The client device 312 will receive the http redirect response from the block page service and issue another request to the block page service, specifying the requested domain in the destination URL. When the block page service receives this additional request in a further iteration of FIG. 6 at step 602, it determines that a bypass cookie is set on the client device for the requested domain at step 604. In response, the block page service will proxy the request for the network resource at the requested domain as set forth in steps 606-612.

Figure 7:
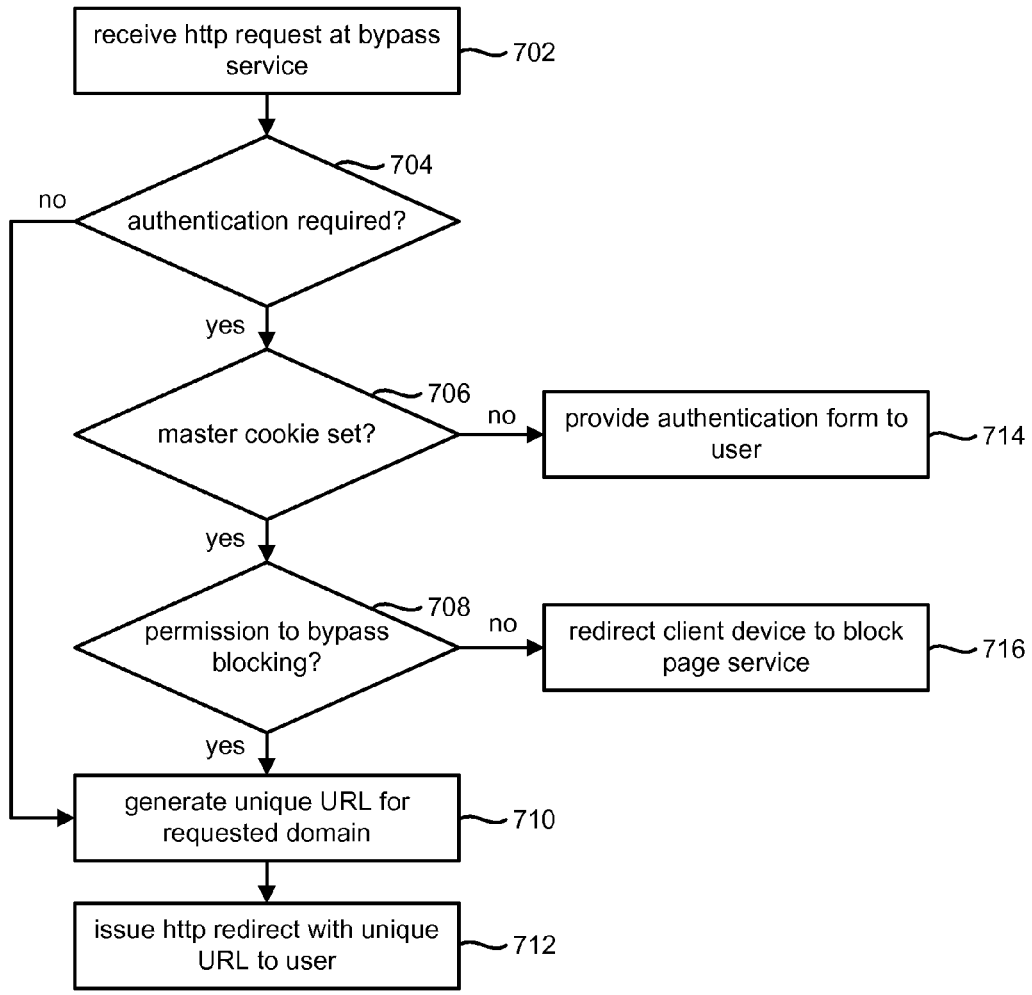
FIG. 7 is a flowchart describing a method of authenticating a user at a block page bypass domain in accordance with one embodiment.

FIG. 7 is a flowchart describing a method for processing requests at the bypass service, as can be performed in response to a request from a client device 312 that results from a redirect at step 620 of FIG. 6. At step 702, the bypass service receives a request from client device 312 from the redirect at step 620. At step 704, the bypass service determines whether authentication is required for the requested domain. For example, some domains may be flagged for network-based proxying without authenticating individual users so that traffic from the subscriber network 310 can be logged, etc.

If authentication is required for the requested domain according to the network record preferences, the bypass service determines whether the client device has a master cookie set for the domain of the bypass service at step 706.

If the master cookie is already set for the client device, the bypass service determines whether the user identified by the master cookie has the necessary permissions to access the requested domain. The bypass service may use the network records 352 and user records 354 to determine whether a user can bypass or override a network preference to block a domain.

If the user has the necessary permissions to override blocking of the domain, the bypass service generates a unique URL including the requested domain at step 710. The unique URL is configured for recognition by the block page service to trigger a redirect for setting the bypass cookie for the requested service. The unique URL may include a predetermined identifier that the block page service is configured to recognize as indicating the request has resulted from a redirect at the bypass service and a local cookie should be set for the requested domain. At step 712, the bypass service issues a response to the client device, including a redirect with the unique URL as the destination URL.

Returning to step 708, if it is determined that the user does not have the necessary permissions to override blocking of the requested domain, the bypass service issues a response to the client device at step 716 with a redirect to the block page service. The redirect does not contain the unique URL as described above, and instead specifies the block page service as the destination URL. The client device can issue a request for the redirected block page service and receive a block page indicating that the user does not have the necessary permissions to access the requested domain. A master cookie for the bypass service can be set on the client device at step 716 to bypass further authentication of the user at the bypass service for future requests.

Returning to step 706, if it is determined that the master cookie for the domain of the bypass service is not set on the client device 312, the bypass service provides an authentication form to the client device 312 at step 714. In one example, the authentication form requests that the user submit a username and password, although other authentication techniques may be used.

Figure 8:
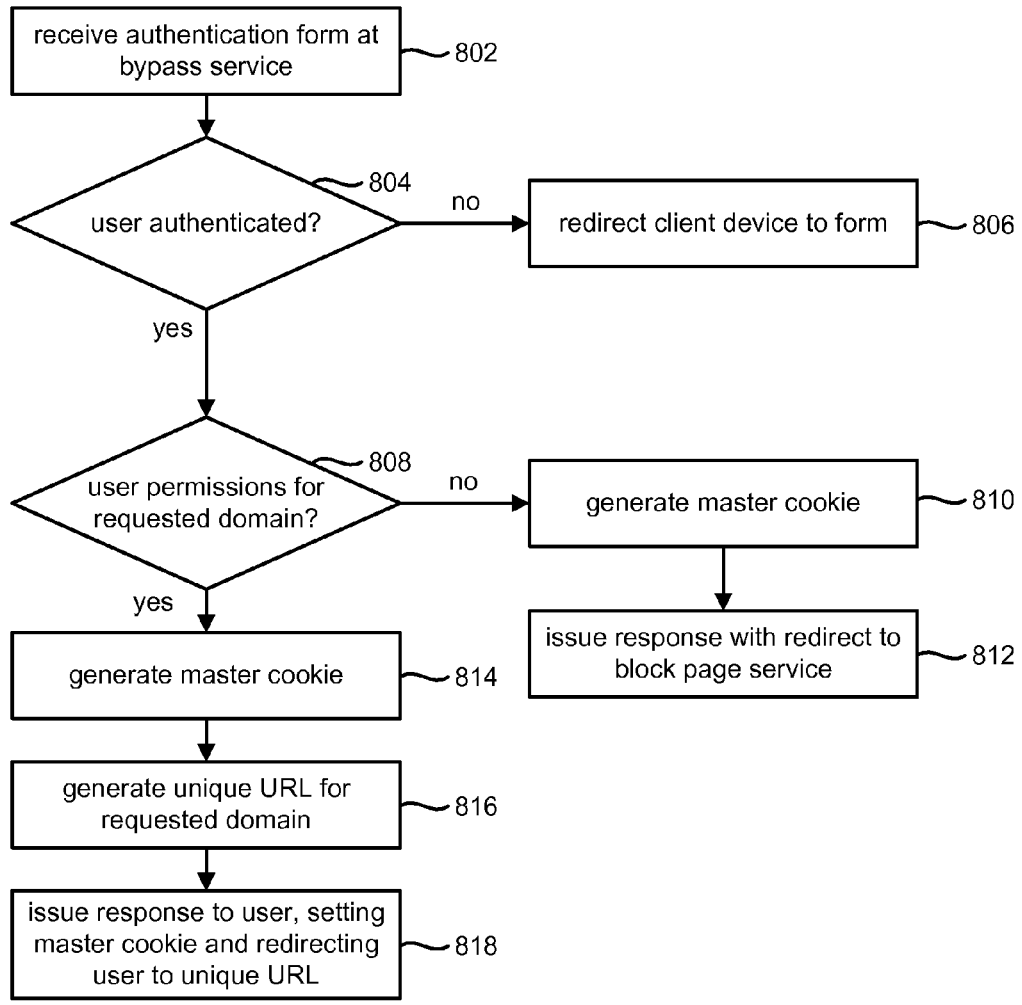
FIG. 8 is a flowchart describing a method of processing an authentication form by a block page bypass domain in accordance with one embodiment.

FIG. 8 is a flowchart describing a method performed by the bypass service 338 in response to receiving the information from the authentication form provided at step 714 of FIG. 7. At step 802, the bypass service at web server 334 receives a request from client device 312 passing the authentication form data. At step 804, the bypass service attempts to authenticate the user using the form data. If the user is not authenticated, the client device can be redirected back to the form to attempt to authenticate again at step 806. If the user is authenticated, the BPB domain determines whether the user has the necessary permissions to bypass blocking for the requested domain at step 808. If the user does not have the necessary permissions, a master cookie for the bypass service is generated at step 810 and set on the client device with a response provided at step 812. The response at step 812 may redirect the client device to the block page service, with a URL for a page indicating that the user does not have the necessary permissions to bypass blocking for the requested domain.

If the user has the necessary permissions as determined at step 808, the bypass service generates the master cookie for the user at step 814. The bypass service then generates a unique URL containing the requested domain at step 816. The unique URL is configured for recognition by the block page service as indicating a local cookie for the requested domain should be set on the client device 312. At step 818, the bypass service issues a response to the client device, passing the master cookie and redirecting the client device to the block page service with the unique URL specified for the requested domain.

Figure 9:
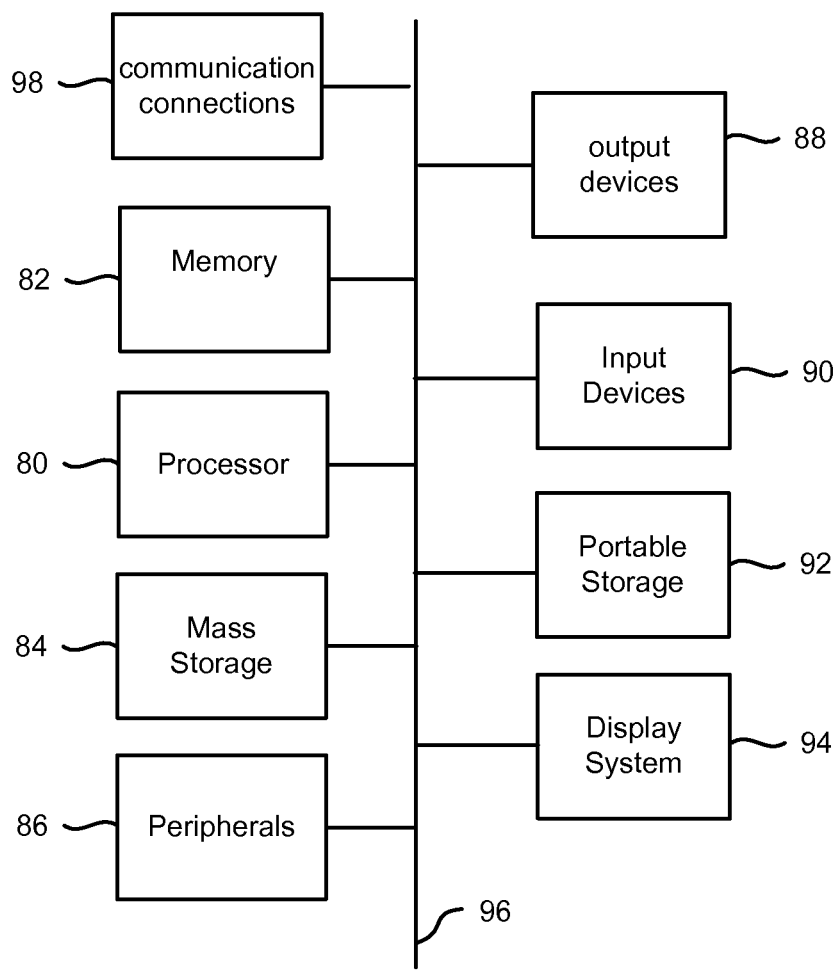
FIG. 9 is a simplified block diagram of a computing device that can be used to implement various embodiments of the disclosed technology.

FIG. 9 is a high level block diagram of a computing system which can be used to implement any of the computing devices of FIG. 3. The computing system of FIG. 9 includes processor 80, memory 82, mass storage device 84, peripherals 86, output devices 88, input devices 90, portable storage 92, and display system 94. For purposes of simplicity, the components shown in FIG. 9 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 9. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 9 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 9 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein can be implemented using hardware, software, or a combination of both hardware and software. The software used is stored on one or more of the processor readable storage devices described above (e.g, memory 82, mass storage 84 or portable storage 92) to program one or more of the processors to perform the functions described herein. The processor readable storage devices can include non-transitory, tangible computer readable media such as volatile and non-volatile media, removable and non-removable media. Tangible computer readable media may be implemented in any method or technology for storage of information such as computer readable instructions, data structures, program modules or other data. Examples of tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer. In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more tangible computer readable media/storage devices, peripherals and/or communication interfaces. In alternative embodiments, some or all of the software can be replaced by dedicated hardware including custom integrated circuits, gate arrays, FPGAs, PLDs, and special purpose computers.

Figure 10:
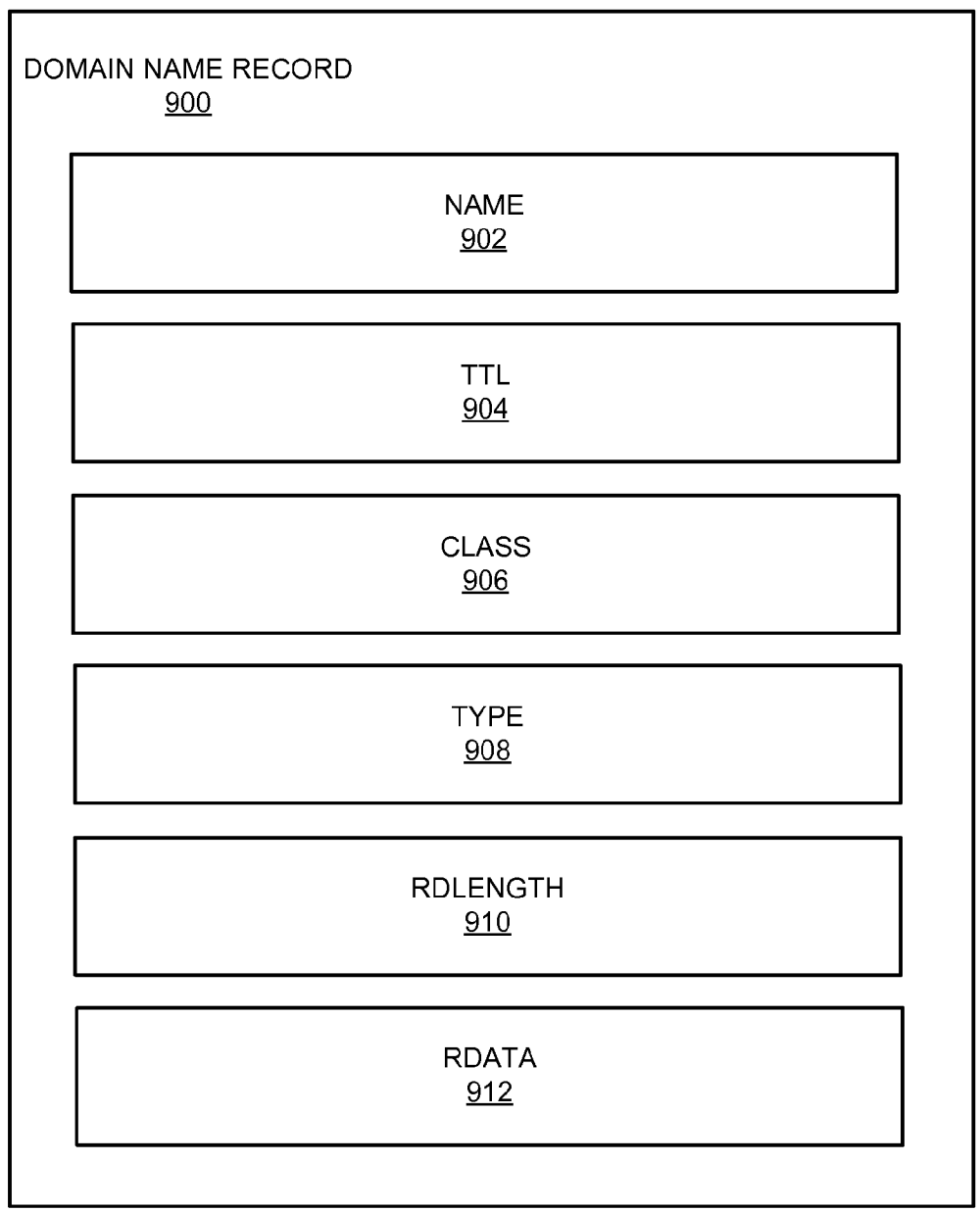
FIG. 10 depicts the structure of an example of a DNS resource record.

FIG. 10 is a block diagram depicting the structure of a domain name resource record that can be stored in the local cache at the recursive DNS clusters. Each resource record includes a name field 902, a TTL field 904, a class field 906, a type field 908, an RDLENGTH field 910 and an RDATA field 912. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 11:
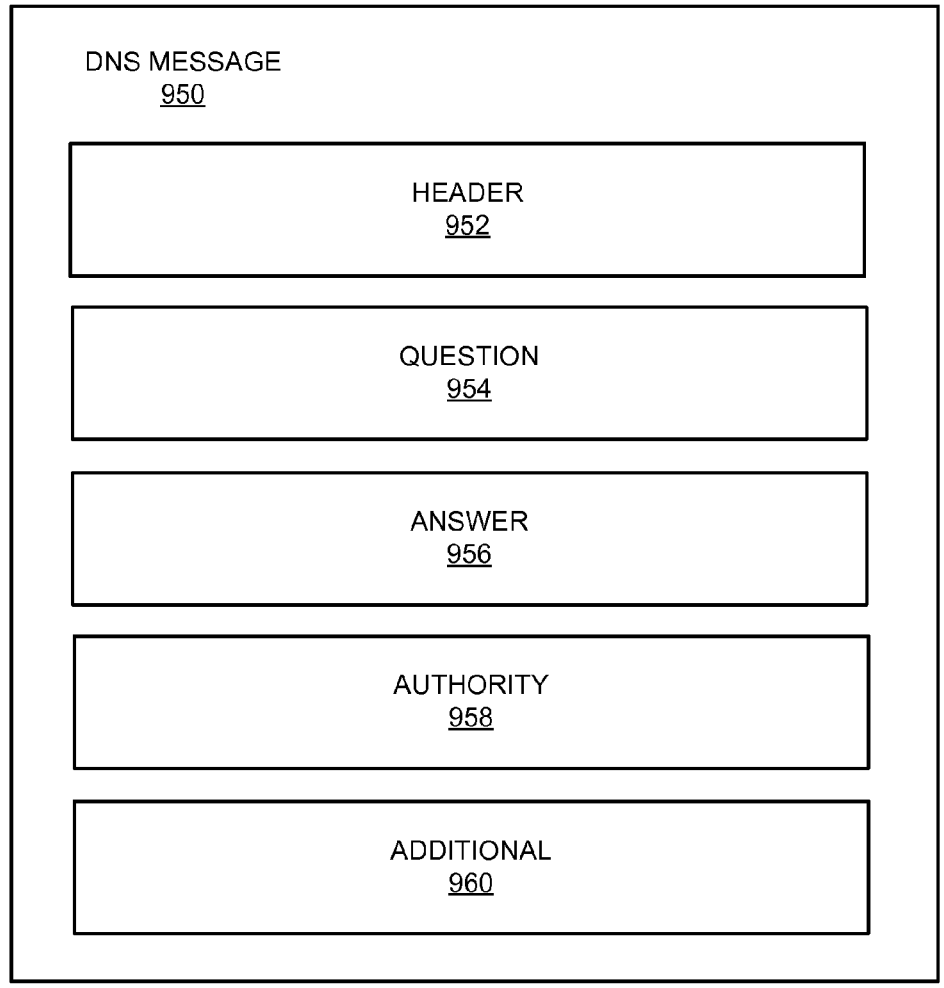
FIG. 11 depicts the structure of an example of a DNS message.

FIG. 11 is a block diagram depicting the structure of a DNS message response or request 950. A DNS message includes a header field 952, a question field 954, an answer field 956, an authority field 958 and an additional field 960. The question field indicates the question for (or request) of the name server in a DNS request. The answer field in a DNS response includes one or more resource records answering a question from a DNS request. The authority field includes one or more resource records pointing to an authority. The additional field is structured like a resource record and can include various types of information.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of domain name system (DNS) processing, comprising:
   receiving, at a DNS server, a plurality of DNS requests associated with a first subscriber, the plurality of DNS requests being for a first domain;
   based on at least one network record associated with the first subscriber, generating a response to each DNS request having domain name information for a second domain;
   receiving at the second domain a set of requests for resources from the first domain;
   for a first request of the set having a predetermined identifier for the first domain, generating a first response with one or more resources from the first domain; and
   for a second request of the set without a predetermined identifier for the first domain, generating a second response with one or more resources from the second domain;
   wherein a third request of the set is received prior to receiving the first request, the third request not having the predetermined identifier, the method further comprising:
   accessing a first user record in response to the third request, the first user record being associated with the first subscriber;
   generating the predetermined identifier for the first domain based on the first user record;
   generating a third response including the predetermined identifier and a redirect with a destination locator corresponding to the first domain.

2. A method according to claim 1, further comprising, after receiving the third request and before determining the first user record:
   generating at the second domain a fourth response having a redirect with a destination locator corresponding to a third domain;
   receiving a fourth request at the third domain after generating the fourth response, wherein the first user record is accessed at the third domain in response to the fourth request;
   generating a fifth response at the third domain, the fifth response including a redirect with a unique universal resource locator generated by the third domain for the first domain; and
   receiving a fifth request at the second domain including the unique universal resource locator generated by the third domain;
   wherein the predetermined identifier for the first domain and the third response are generated at the second domain for the first domain in response to receiving the fifth request with the unique universal resource locator.

3. A method according to claim 2, wherein:
   the first request is received at the second domain after generating the third response with the identifier for the first domain.

4. A method according to claim 1, wherein the one or more resources from the second domain include a redirect with a destination locator corresponding to a third domain, the method further comprising:
   receiving a fourth request at the third domain after generating the second response;
   accessing a second user record in response to the fourth request at the third domain, the second user record being associated with the first subscriber;
   generating a fourth response having a redirect with a destination locator corresponding to the second domain based on the second user record.

5. A method according to claim 4, further comprising:
   receiving a fifth request at the second domain after generating the fourth response; and
   generating a fifth response having one or more resources from the second domain.

6. A method according to claim 5, wherein the one or more resources from the second domain indicate that a second user corresponding to the second user record is not permitted access to the first domain.

7. A method according to claim 1, wherein said receiving at the second domain comprises receiving at a web server associated with the second domain.

8. A method of domain name system (DNS) processing, comprising:
   determining at a DNS server subscriber information associated with a first DNS request corresponding to a first domain;
   in response to the first DNS request and based on the subscriber information, generating a DNS response having domain name information for a second domain;
   receiving at the second domain, a first resource request corresponding to the first domain, the first resource request having a first universal resource locator for the first domain;
   if the first resource request includes a predetermined identifier previously generated by the second domain for the first domain, providing a request for one or more resources associated with the first resource request from the second domain to the first domain;
   if the first resource request does not include the predetermined identifier for the first domain, generating a redirect response to a third domain;
   receiving at the third domain a second resource request associated with the redirect response;
   accessing a user identification based on the second resource request;
   generating a redirect response to either the first domain or the second domain depending on a user corresponding to the user identification is permitted to access the first domain.

9. A method according to claim 8, wherein generating the redirect response comprises:
   generating the redirect response having a unique universal resource locator for the first domain if a user corresponding to the user identification is permitted access to the first domain; and
   generating the redirect response to the second domain if the user corresponding to the user identification is not permitted access to the first domain.

10. A method according to claim 9, further comprising:
receiving at the second domain a third resource request having the unique universal resource locator for the first domain; and
in response to the third resource request having the unique universal resource locator, generating the predetermined identifier and a redirect response having the first universal resource locator.

11. A method according to claim 9, further comprising:
receiving at the second domain a third resource request having a universal resource locator corresponding to the second domain; and
in response to the third resource request having the universal resource locator corresponding to the second domain, generating at the second domain a response having one or more resources from the second domain indicating that the user corresponding to the user identification is not permitted access to the first domain.

12. A method according to claim 9, further comprising:
determining at the DNS server a source internet protocol (IP) address associated with the first DNS request;
accessing by the DNS server one or more network records in the subscriber information based on the source IP address, the one or more network records including one or more settings indicating that domain name information for the first domain should not be supplied for DNS requests associated with the source IP address; and
accessing at the third domain one or more user records in the subscriber information based on the user identification, the one or more user records including one or more settings indicating whether or not the user corresponding to the user identification should have resource requests associated with the first domain fulfilled at the second domain.

13. A method according to claim 8, further comprising:
receiving a response from the first domain containing the one or more resources indicated in the first resource request; and
generating a response to the first resource request having the one or more resources from the requested domain.

14. One or more non-transitory processor readable storage media having processor readable code embodied on the one or more non-transitory processor readable storage media, the processor readable code for programming one or more processors to perform a method of domain name system (DNS) processing, comprising:
receiving, at a DNS server, a plurality of DNS requests for a first domain, the first domain being associated with first domain name information;
generating, in response to the plurality of DNS requests, a plurality of DNS replies having domain name information for a second domain;
receiving at the second domain a plurality of resource requests having a resource locator corresponding to the first domain;
in response to a first subset of the resource requests, generating at the second domain a first plurality of replies having one or more resources from the first domain; and
in response to a second subset of the resource requests, generating at the second domain a second plurality of replies having one or more resources from the second domain;
wherein the one or more resources from the second domain include a redirect to a third domain, the method further comprising:
receiving at the third domain a second plurality of resource requests corresponding to the redirect in the second plurality of replies;
accessing a user identification in response to each of the second plurality of resource requests;
for each resource request with a corresponding user that is permitted access to the first domain:
generating a second resource locator for the first domain and generating a redirect including the second resource locator; and
for each resource request with a corresponding user that is not permitted access to the first domain:
generating a redirect including a resource locator for the second domain.

15. One or more non-transitory processor readable storage media according to claim 14, wherein the method further comprises
receiving at the second domain a third plurality of resource requests having the second resource locator for the first domain; and
in response to the third plurality of resource requests, generating at the second domain a predetermined identifier for the first domain and a plurality of redirects having the first resource locator for the first domain.

16. One or more non-transitory processor readable storage media according to claim 15, wherein:
the first subset of the resource requests include the predetermined identifier.

17. One or more non-transitory processor readable storage media according to claim 16, wherein:
the predetermined identifier is a cookie for the first domain generated at the second domain.

18. A method of domain name system (DNS) processing, comprising:
receiving, at a DNS server, a plurality of DNS requests associated with a first network identifier, each DNS request including a requested domain from a set of domains;
for each DNS request of the plurality that is associated with a first subset of domains, generating a DNS reply having domain name information for its requested domain;
for each DNS request of the plurality that is associated with a second subset of domains, generating a DNS reply having domain name information for a substitute domain;
receiving at the substitute domain a first set of resource requests associated with the first network identifier, each resource request in the first set including a requested domain from the second subset of domains;
for each resource request in the first set, generating at the substitute domain a reply having one or more resources from the requested domain corresponding to said each resource request;
proxying each resource request in the first set by issuing from the substitute domain a request to the requested domain corresponding to said each resource request;
receiving at the substitute domain a second set of resource requests associated with the first network identifier, each resource request in the second set including a requested domain from the second set of domains; and
for each resource request in the second set, generating at the substitute domain a reply having one or more resources from the second domain.

19. A method according to claim 18, wherein:
for each resource request in a first subset of the second set of resource requests, the one or more resources from the second domain include a redirect response to authenticate a user associated with said each resource request;

for each resource request in a second subset of the second set of resource requests, the one or more resources from the second domain include a predetermined identifier for the requested domain corresponding to said each resource request in the second subset, the predetermined identifier being generated by the second domain.

* * * * *